United States Patent

Patmore et al.

[15] 3,678,258

[45] July 18, 1972

[54] DIGITALLY CONTROLLED ELECTRONIC FUNCTION GENERATOR UTILIZING A BREAKPOINT INTERPOLATION TECHNIQUE

[72] Inventors: James R. Patmore, Neptune; Walter Frank Bozenhard, Eatontown; Gavino Anthony Spampanato, Bricktown, all of N.J.

[73] Assignee: Electronic Associates, Inc., Long Branch, N.J.

[22] Filed: Sept. 29, 1970

[21] Appl. No.: 76,387

[52] U.S. Cl. .......... 235/150.53, 235/197

[51] Int. Cl. .......... G06j 1/00

[58] Field of Search .......... 235/197, 150.53, 150.5, 152; 328/142; 307/229; 340/347 DA, 347 AD

[56] References Cited

UNITED STATES PATENTS

| | | | |
|---|---|---|---|
| 3,373,273 | 3/1968 | Schubert | 235/150.53 X |
| 3,480,767 | 11/1969 | Howe | 235/150.53 |
| 3,513,301 | 5/1970 | Howe | 235/150.53 |
| 3,557,347 | 1/1971 | Robertson | 235/197 X |

*Primary Examiner*—Joseph F. Ruggiero
*Attorney*—Edward A. Petko and Robert M. Skolnik

[57] ABSTRACT

The specification discloses a digitally controlled function generator wherein breakpoint information for a given function is developed by a digital computer. A search function is employed by comparing the value of the analog input with the values of two adjacent breakpoints to ascertain whether the analog input is between the X coordinates of the breakpoints. If the comparison indicates that the value of the analog input is within the breakpoints, the corresponding Y coordinate values are removed from a memory and the interpolation equation $$fx = Y_n + \frac{\Delta Y}{\Delta X}(X - X_n)$$

is solved to produce the desired output. If the comparators indicate that the analog input signal lies outside the X coordinates of the breakpoints, new values X coordinates are searched until the analog signal is bracketed.

A floating point technique is utilized in control of digitalanalog multipliers to thereby select the smallest possible valued resistors in the multiplier to enhance the dynamic response of the system.

6 Claims, 7 Drawing Figures

PATENTED JUL 18 1972

3,678,258

INVENTOR.
WALTER FRANK BOZENHARD
JAMES R. PATMORE
GAVINO ANTHONY SPAMPANATO

BY Robert M. Skolnik
ATTORNEY

DIGITALLY CONTROLLED ELECTRONIC FUNCTION GENERATOR UTILIZING A BREAKPOINT INTERPOLATION TECHNIQUE

In the computer, automatic control, simulation and instrumentation arts, a wide variety of applications require that voltages be generated as functions of one or more independent variables. The most commonly used device for analog function generation, at least in recent years, has been the diode function generator. In the most common form of such a device a function $f(x)$ is approximated using a finite number of straight-line segments, by summing together in an operational amplifier, a parallax or bias current $f_0$, a linear central-slope current $f_x(x)$, and a plurality of slope incremental currents $f_1$, $f_2, f_3 \ldots$. The slope incremental functions are generated using simple biased diode networks connected to the summing junction of the operational amplifier. The breakpoint voltages $x_1$, $x_2 \ldots$ can be distributed on either or both sides of the origin $x = 0$. A basic description of such function generators is given in Chapter 5 of the book "Design Fundamentals of Analog Computer Components" (D. Van Nostrand Company, New York, 1961). A principal shortcoming of such prior art function generators has been the time required to adjust them to provide a desired function. An N-segment function has required one adjustment of parallax, one for central slope, and 2 (N − 1) adjustments for the breakpoints and slope increments. Usually these adjustments have been accomplished with hand-set potentiometers, in an exact procedural order which has been time-consuming, and such set up time has remained time-consuming even when the hand-set potentiometers have been replaced by servo-set potentiometers. Also, servo-set (or hand-set) diode function generators have been undesirably complex and expensive, and have tended to have poor dynamic performance due to the capacitive characteristics of the multi-turn helical potentiometers usually utilized for such function generation. In a number of hybrid (both analog and digital) computer applications it becomes either necessary or desirable to be able to set up desired functions very rapidly, in a matter of milliseconds rather than minutes.

A wide variety of schemes have been proposed to improve the function setup speed of conventional diode function generators, including means such as the storage of breakpoints and slope increments on punched cards with punched holes representing breakpoint or slope bits, and the use of removable patchboards to store the required connections to implement desired functions. Some such function generators have been undesirable in that they have required special card readers, and some have been difficult to set up accurately due to the effects of diode rounding and breakpoint interaction with slope sensitivity. Prior diode function generators using either cards or patchboard for function storage have been tedious and time-consuming to set up unless extensive digital computer programs have been available for such purposes.

A further known type of function generator is a hybrid type which employs a DAC (digital-to-analog converter) and a DAM (digital-analog multiplier) in conjunction with an operational amplifier, to represent a function f(x) with n straight-line segments by the formula $$f(x) = a_n(x) + b_n \qquad x_n \quad x \quad x_n + 1$$

The slope $a_n$ and intercept $b_n$ are obtained from a digital computer, and are updated to new values every time the independent input variable x passes into a new segment region. In these function generators linear interpolation is accomplished by analog means and storage is accomplished in the digital computer. A shortcoming of this prior art scheme is the discontinuous jump in the output function which results from any delay in updating $a_n$ and $b_n$ to new values when $x$ enters a new segment region. In addition, a significant amount of digital computer time is required. Variations of this scheme using sawtooth and triangular analog interpolating functions have been suggested in the prior art, as has utilization of this scheme for generating functions of two or more variables.

The function generator approximates a given curve with straight line segments by the equation $$f(x) = Y = Y_n + \frac{Y_n + 1 - Y_n}{X_n + 1 - X_n}(X - X_n) \qquad (1)$$

where $X_n$, $Y_n$, $X_{n+1}$ and $Y_{n+1}$ are breakpoint values supplied from a memory associated with the function generator, and X and Y are the coordinates of a point between the breakpoints.

Equation (1) may be simplified as follows $$f(x) = Y = Y_n + \frac{\Delta Y}{\Delta X}(X - X_n) \qquad (2)$$

Equation (2) represents an interpolation producing a value of $Y$ for a point along a segment of a curve. Choosing the correct segment of a curve to interpolate $X$ and find a correct value of $Y$ are accomplished by the search and control features of the present invention.

It is an object of the present invention to provide an improved digitally controlled function generator utilizing an interpolation technique to develop the desired function between breakpoints.

Another object of the present invention is a digitally controlled function generator employing a floating point technique to select the smallest value of resistor possible in the digital-analog multipliers.

These as well as further objects and advantages of the present invention will be apparent to those skilled in the art from the following specification reference being made to the accompanying drawings in which.

Figure 1:
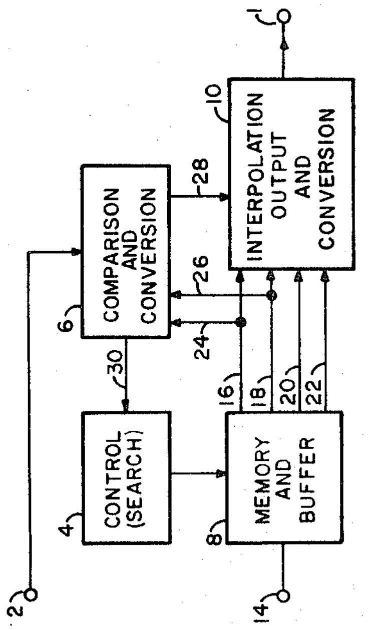
FIG. 1 is a block diagram of system operation.

In FIG. 1, a block diagram of overall system operation is shown. An analog input X is supplied to terminal 2. This input may be advantageously supplied from an analog computer providing suitable flexibility of connections so that different analog inputs may be connected to terminal 2 as desired by the programmer.

Digital inputs representing breakpoint values of the linear approximation to the desired curvilinear function are supplied at terminal 14 for storage in memory 8 from a digital computer or alternately from a TELETYPE unit. More particularly, unit 8 stores a number of X and Y breakpoint values, dependent upon the size of memory 8, and outputs respective sets of X and Y values in digital form in parallel.

Conductors 16, 18, 20, and 22 couple the digital values of $X_n$, $X_{n+1}$, Yn, and $Y_{n+1}$ (coordinate values of X and Y defining two connective breakpoints) to Interpolation Output and Conversion Unit 10 while the $X_n$ and $X_{n+1}$ values are also connected to Comparison and Conversion unit via leads 24 and 26.

The digital signals representing $X_n$ and $X_{n+1}$ are converted to analog form and compared in amplitude with the analog input signal at terminal 2. If the amplitude of the analog input is not between these two values (i.e., $X_n$ and $X_{n+1}$) the comparison circuits cause the control unit 4 to search memory 8 for a pair of stored values which satisfy the relationship $X_n < X < X_{n+1}$. When such values for $X_n$ and $X_{n+1}$ are found, these $X_n$ and $X_{n+1}$ signals as well as the corresponding $Y_n$ and $Y_{n+1}$ values are conducted to the Interpolation Output and Conversion Unit 10.

Through the use of logical subtractors, digital to analog converters (DAC), and digital to analog multipliers (DAM), the interpolated value Y is formed from its corresponding analog value X at output terminal 12.

Figure 2B:
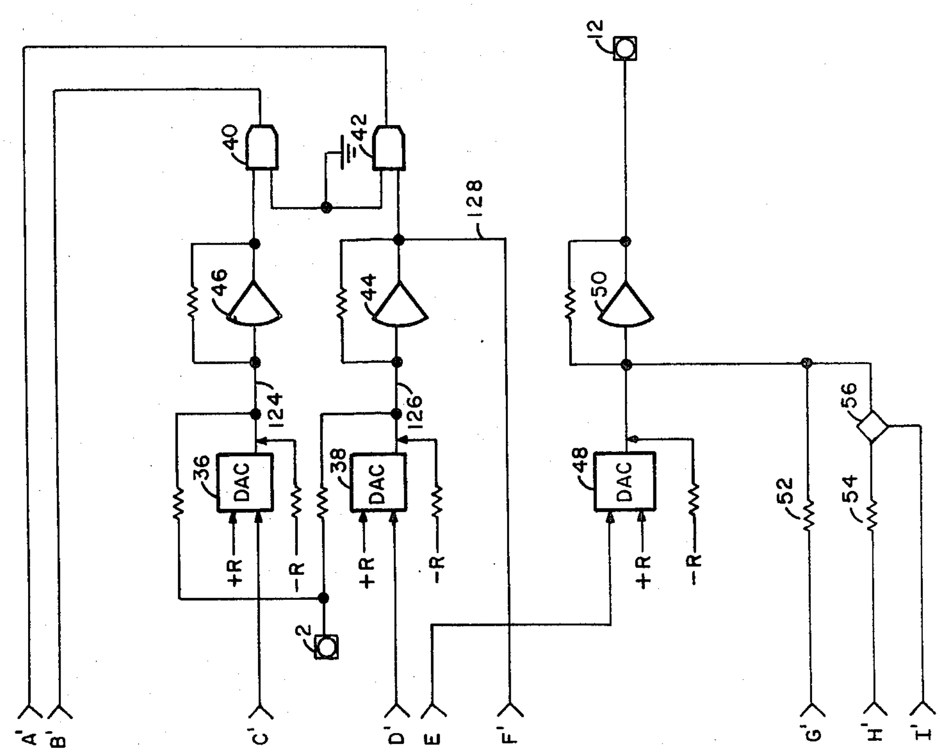
FIGS. 2A and 2B are detailed block diagram of the invention.
Figure 2A:
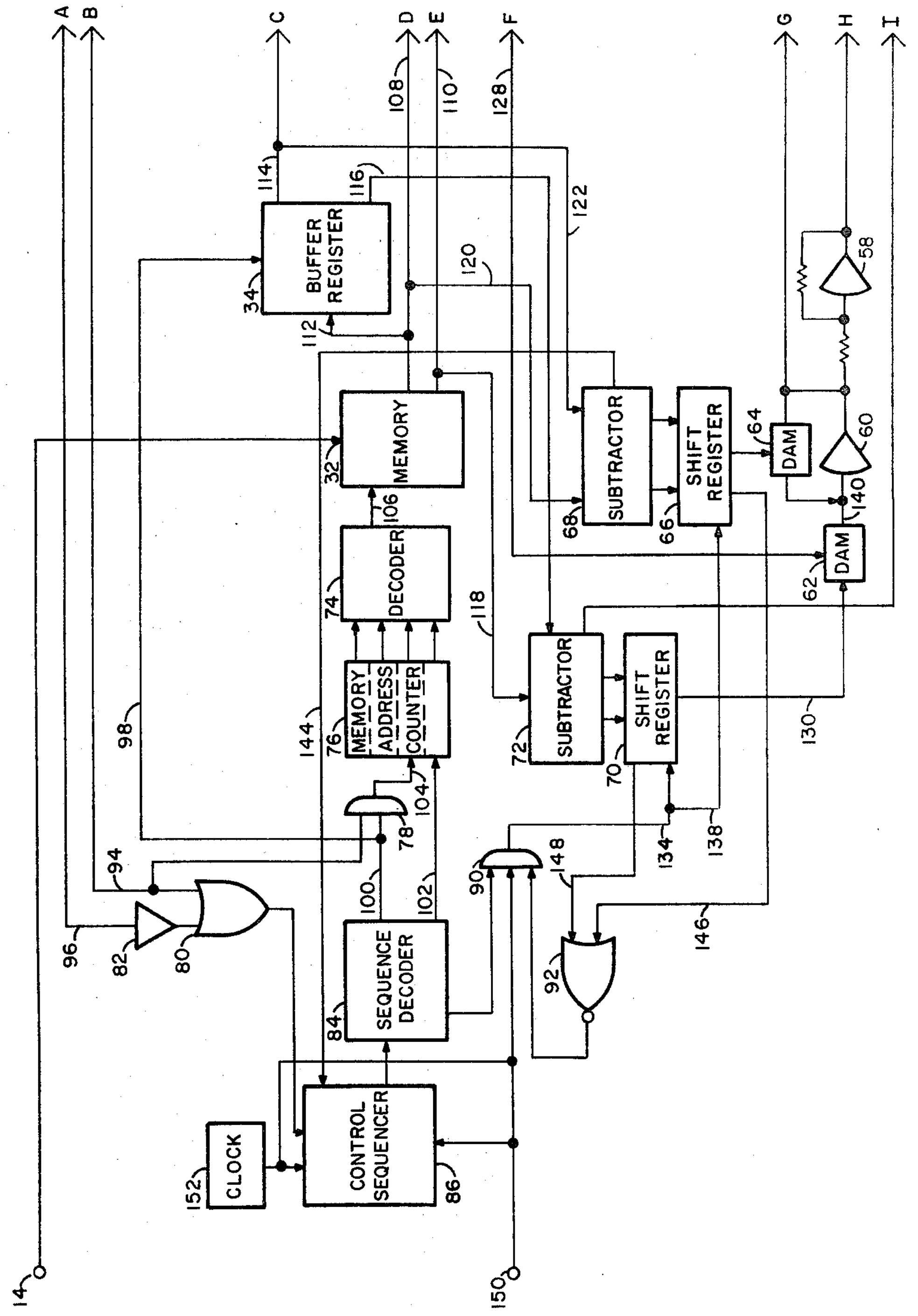

FIGS. 2A and 2B constitute a detailed block diagram of the preferred embodiment of the invention. In FIGS. 2A and 2B, numerals 2, 12, and 14 denote the analog input, output, and digital inputs respectively. These numerals were similarly applied to their respective components in the discussion of FIG. 1, above. In the description of FIGS. 2A and 2B, the letter designations A, A′; B, B′; . . . ; I, I′ denote corresponding connections between the two figures.

Turning first to the control and search function (block 4 in FIG. 1), it will be seen from FIG. 2A that this block includes a control sequencer 86 which, as will be later described, includes a free running gated multivibrator and a counter. The gated multivibrator provides clock pulses for stepping the counter. The counter sequencing is initiated by the output of comparators 40 and 42, FIG. 2B, via leads 94 and 96 respectively. More particularly, an inverter 82 and an OR gate 80 are connected to activate the multivibrator in control sequencer 86. The output of control sequencer 86 is connected to a sequence decoder 84 which, as will be described later, decodes the states of the output of sequencer 86 into their respective functional equivalents for the remainder of the structure. More particularly, the first two states of the output of control sequencer 86 are decoded by decoder 84 to line 100 which is connected to memory address counter 76 via AND gate 78 and lead 104. If lead 104 is a logical ONE, the memory address counter 76 counts up during this time. Lead 100 is also coupled to a buffer register 34 via lead 98 where it is used as the load pulse. Lead 102 connects the third state as decoded by decoder 84 to memory address counter 76. The sequencer state on lead 102 controls down counting in counter 76. As can be seen from the direct connection of lead 94 to counter 76 via gate 78 and lead 104, a logical ONE at the output of comparator 40 is required as well as the states on lead 100 to count up counter 76. The output of the memory address counter 76 is connected in parallel to decoder 74 which generates appropriate address for memory 32 via lead 106. In this manner, accessing and selection of the various breakpoint information stored in memory 32 is accomplished. The $X_n$ and $Y_n$ breakpoint values are read out of memory 32 via leads 108 and 110 respectively. Lead 108 connects the $X_n$ value to one input of a digital to analog converter (DAC) 38. This memory output is also connected to buffer register 34 via lead 112. The value of $Y_n$ is connected, via lead 110, to another digital to analog converter 48. In addition, the value of $Y_n$ is connected to a digital subtracter 72 via lead 118, and the value $X_n$ is connected to another digital subtracter 68 via lead 120. The output of buffer register 34 representing the next sequential value of X breakpoint information, $X_{n+1}$, is connected to a first digital to analog converter 36 via lead 114, and to the aforementioned digital subtracter 68 via lead 122. In addition, the output $Y_{n+1}$ of buffer register 34 is connected to the aforementioned digital subtracter 72 via lead 116. In this manner, digital subtracter 68 receives as inputs the two X coordinate values of breakpoint information $X_n$ and $X_{n+1}$ to generate a digital difference output ΔX. It can also be seen at this time that subtracter 72 receives as inputs the Y coordinates of breakpoint data $Y_n$ and $Y_{n+1}$ producing the digital difference ΔY in parallel.

Digital to analog converter 36 receives as inputs plus and minus reference and the digital signal representing $X_{n+1}$. In the conventional manner, therefore, an analog current representative of $(REF - X_{n+1})$ is produced at the output of converter 36 (lead 124). The digital to analog converter 38 receives as an input, the digital signal representative of $X_n$ and produces on lead 126, the analog current, $(REF - X_n)$. Lead 124 connects the output of digital to analog converter 36 to the input of the first amplifier 46 while lead 126 connects the output of digital to analog converter 38 to the input of a second amplifier 44. The function of the comparison circuitry is two-fold depending upon whether the analog input signal X is between breakpoints or is crossing one of them. The situation where analog input X is between the breakpoints will be described first. Amplifier 44 will be seen to sum the analog input of digital to analog converter 38 with negative reference and the input signal at terminal 2. The output of amplifier 44 is proportional to $X-X_n$ and is negative so long as the analog input at terminal 2 is greater than the value $X_n$. Amplifier 46 will be seen to also sum the value of $X_{n+1}$ with negative reference and the X value to be proportional to $X-X_{n+1}$ and will be positive as long as the input voltage at terminal 2 is less than $X_{n+1}$. The output of amplifier 44 is thus negative while the output of amplifier 46 is positive. The output of amplifier 44 is connected to a comparator 42 while the output of amplifier 46 is connected to a similar comparator 40. As shown in the Figure both comparators are comparing their inputs to ground. The output of comparator 42 is a logical ONE and the output of comparator 40 will thus be a logical ZERO.

If the input signal at terminal 2 increases until it equals the value of $X_{n+1}$, amplifier 46 will produce a zero output and its associated comparator 40 will switch to the logical ONE state. If however, the analog input at terminal 2 decreases until it equals the value of $X_n$, amplifier 44 will produce a zero output and its associated comparator 42 will switch to the logic ZERO state. In this manner, comparators 40 and 42 sense when a breakpoint has been crossed and whether the breakpoint $X_n$ or the $X_{n+1}$ has been equaled (whether the value of X is increasing or decreasing).

The output of amplifier 44 is connected as an input to a digital to analog multiplier (DAM) 62 via lead 128. The digital input for DAM 62 is provided by a lead 130 as the output of a bit shift register 70. The shifting of register 70 for the Y difference signal ΔY and the shifting of a corresponding register 66 for the X difference signal ΔX is accomplished via leads 134 and 138. These leads carry control signals developed by sequence decoder 84 in combination with a clock signal from the free running multivibrator in sequencer 86. All control signals for the shifting are gated via AND gate 90. The Y difference signal, ΔY, and the X difference signal, ΔX, are shifted left via appropriate shift signals developed on the leads described above. This represents an important feature of the subject invention. Such shifting accomplishes a "floating point" operation and connection with selection of appropriate resistors in the resistor matrix of DAMS 62 and 64. The result of this shifting operation is the selection of the smallest resistor possible for the respective values of ΔX and ΔY as stored in registers 66 and 70. Selection of the smallest possible resistors results in the smallest possible response time for the computation circuitry comprised of amplifier 60 and digital analog multiplier 64.

The output of DAM 62 is connected to the input of amplifier 60 via lead 140. Amplifier 60 has another DAM 64 connected in its feedback loop. Mathematically, the output of DAM 62 is proportional to $\Delta Y\,(X-X_n)$. The effect of DAM 64 in the feedback loop of amplifier 60 is that of a dividing circuit so that a voltage proportional to the quantity $\Delta Y/\Delta X\,(X - Xn)$ is produced at the output of amplifier 60. The output of amplifier 60 is connected to the input of an inverting amplifier 58 whose output is in turn coupled to the input of another amplifier 50 via resistor 54 and electronic switch 56. Amplifier 50 also receives as an input negative reference the output of digital to analog converter 48 which as will be recalled is the quantity $REF-Y_n$. The output of amplifier 50 connected to output terminal 12 is thus the equation $$Y_n + \frac{\Delta Y}{\Delta X}\,(X - X_n)$$

which is the desired $f(x)$. Switch 56 is controlled by a control output of subtracter 72 which indicates sign reversal of the slope of the function. The shifting in register 70 and 66 is continued until one of those registers is full as indicated by the appearance of a logical ONE at lead 146 or 148. These leads are connected to the input of a NOR gate 92 which disables the shifting operation. The values of resistors 52, 54 are chosen such that certain constants are introduced into the output equation supplied to terminal 12. In operation, the subtracter 72 receives $Y_{n+1}$ and $Y_n$ as digital inputs from memory 32 and forms the digital difference $(\Delta Y = Y_{n+1} - Y_n)$ required by DAM 62. In a similar manner X subtracter 68 receives as inputs $X_{n+1}$ and $X_n$ from memory 32 and produces the difference output $\Delta X = X_{n+1} - X_n$.

The shift register 70 and the shift register 66 shift the ΔY and ΔX values left until one or the other as its most significant bit position filled. Each shift has the effect of multiplying ΔY and ΔX by two, but the quotient ΔY/ΔX remains the same. In this way the lowest value resistors of DAM 62 and DAM 64 are always used for a given slope regardless of the magnitude of ΔY and ΔX thereby enhancing the dynamic response of amplifier 60. The polarities of the $X_n$ and $X_{n+1}$ values outputted from memory 32 are known and controlled by loading the memory in ascending order of X. This means that the difference signal ΔX is always positive. In cases where an infinite slope has been programmed ($\Delta X=0$), a signal from the $X$ subtracter 68 via lead 144 informs sequence controller 86 of this fact. Since $\Delta X$ is always positive, the sign of the slope is simply the sign of $\Delta Y$. The Y subtracter 72 provides its difference in sign and magnitude form. The sign bit controls D–A switch 56.

Figure 3:
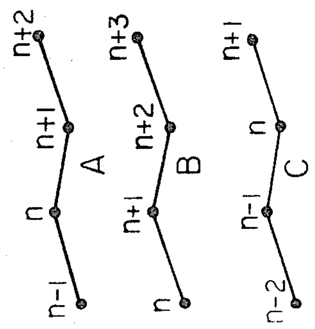
FIG. 3A–3C is a diagram useful in understanding the interpolation scheme employed in the invention.

When a breakpoint is crossed, one of comparators 40 and 42 changes state. At this time, the interpolation and tracking circuitry needs new values for $X_n$, $Y_n$, $X_{n+1}$, and $Y_{n+1}$ for each segment. Since the memory itself outputs $X_n$ and $Y_n$ via leads 108 and 110, and the memory buffer register 34 outputs $X_{n+1}$ and $Y_{n+1}$ via leads 114 and 116, some method is required for determining the proper memory location to access. This is best explained with reference to the diagram in FIG. 3. FIG. 3 shows three segments of a curve to be generated. If the function generator is interpolating the middle segment as in FIG. 3A, breakpoint n is on the left and breakpoint $n+1$ is on the right. If the input decreases so that breakpoint n is crossed, an interpolation must begin on the lefthand segment requiring new breakpoint data. As shown in FIG. 3B, breakpoint n must now become the new $n+1$ breakpoint and the old $n-1$ breakpoint becomes the new breakpoint $n$. To get the new $n+1$ data into buffer register 34 as well as produce the new n data at the outputs of memory 32, it is only necessary to load the buffer register with the present memory location outputs and then to decrement the memory address by 1. An inspection of FIG. 3C reveals that if the input moves from the middle segment to the right hand segment, the following three steps are required to produce new data in the proper locations: (1) increment the memory address by two; (2) load the buffer register with these contents (that is the contents of location $n+2$); and (3) decrement the memory address by one. These memory addresses are generated by counter 76.

Another function of control sequencer 86 is to place amplifiers 60, 50, 44 and 46 into the store mode until all digital data is loaded into the various DAC's and DAM's. The purpose of the track store amplifiers is to reduce the effect of transients during updating. All amplifiers except amplifier 58 are placed in store before any other actions take place. As soon as the memory advancing and the buffer register load is complete, amplifiers 44 and 46 are released from store so they may settle and begin tracking the input by the time the control sequencer becomes inactive. After the shifting of register 66 and 70 is completed, amplifier 60 is released from store. The control sequencer 86 is then inactive but the output amplifier 50 is held in store for a short time to allow for settling of amplifier 60.

A further function of control sequencer 86 is to examine the output of subtracter 68 to determine whether $\Delta X=0$. If $\Delta X=0$ two breakpoints have been programmed with the same X value calling for a step in the function to be generated. Under these conditions it is not necessary to release the amplifiers from store since comparators 40 and 42 will change state immediately in any case and amplifier 60 will temporarily overload since the digital input of DAM 64 will be zero. In this case, control sequencer 84 recycles itself to the beginning of the cycle.

Figure 4:
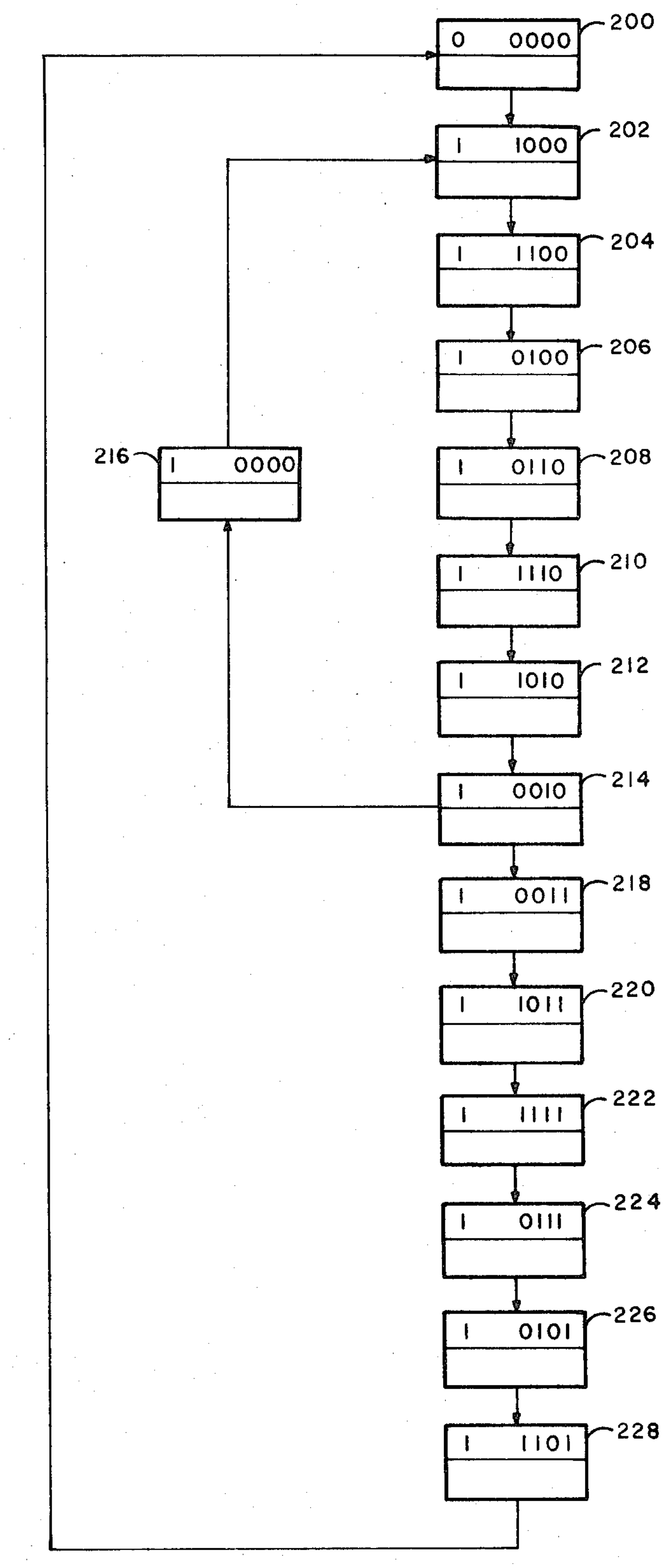
FIG. 4 is a block diagram of control states employed in the invention.

FIG. 4 is a state diagram of the control sequencer 84, which contains five flip-flops. Each block in the Figure represents a sequencer state, and at the top of each block, the states of the individual flip-flops in the sequencer is shown. More particularly, block 200 is labeled inactive and shows the state 00000. This is the sequencer inactive state; when the sequencer is running, the first flip-flop is in the one condition. This flip-flop further functions to lock out comparator inputs and to provide a partial control on track store amplifiers.

Block 202 shows a state which places the amplifiers in the store condition, and increments the memory address if the output of comparator 40 was high. Block 204 increments the memory address if the output of comparator 40 was high as well as loads buffer register 34. Block 206 decrements the memory address. Blocks 208, 210, and 212, are delays to permit the subtracters 68 and 72 to settle.

Block 214 is the control sequence state which loads ΔX and ΔY into the shift register. The control loop from block 214 to block 202 via block 216 is shown which detects whether ΔX is ZERO. If ΔX is ZERO, block 216 represents the control sequencer state which returns to the function shown in block 202. If ΔX does not equal ZERO, the sequencer proceeds to block 218 which represents the control sequencer state for releasing digital to analog converters 36 and 38 from store, and for shifting ΔX and ΔY if respective registers 66 and 70 are not full. States 220, 222, 224, 226, and 228, represent further shifting of the ΔX and ΔY quantities in register 66 and 70 if certain conditions are present. Blocks 220 and 222 shift until one of the either registers is full. Block 224 will shift until the same condition but also triggers a track/store one-shot for amplifier 50. Block 228 will again shift until either register 66 or 70 is full, as does block 226. Block 228, however, represents an additional control function that being releasing Amplifier 60 from store. The sequencer then returns to the inactive condition (block 200), as illustrated by the loop from the output of block 228 to the input of block 200.

We claim:

1. A system for producing an output signal which is a desired function of an input signal comprising:
- a source of digital information representing a plurality of coordinates of the desired function;
- memory means for storing said information;
- an input terminal for receiving an analog signal;
- comparison means connected to said memory means and to said terminal for comparing said analog signal and selected portions of said digital information for producing an output indication when said analog signal and said selected digital information are within predetermined limits and for sequentially selecting new portions of said digital information until said predetermined limits are indicated;
- computing means including digital-analog multiplier means connected to said memory means for producing an output signal representing the configuration of said desired function between selected coordinates;
- register means connected to said digital-analog multiplier means for shifting left the output of said memory means prior to inputting to said computing means for decreasing the response time of said digital-analog multiplier means; and
- combining means connected to said computing means and to said input terminal for producing the desired function of said input signal.

2. A digitally controlled function generator comprising:
- memory means for storing a plurality of digital signals representing coordinates at the breakpoints of a desired function;
- an input terminal for receiving an analog signal;
- comparison means connected to said memory means and to said input terminal for sequentially selecting various ones of said coordinates from said memory unit said analog input signal and said coordinates are within predetermined limits;
- computing means connected to said memory means for producing an output signal representing the configuration of the desired function between coordinates which are within said predetermined limits;
- said computing means including digital-analog multiplying means and shift register means for shifting left the input from said memory means to said computing means thereby reducing errors in said computing means introduced by said digital-analog multiplying means; and
- said computing means including means connected to said input terminal for producing the desired function of the input signal at said input terminal.

3. A digitally controlled function generator comprising:

memory means for storing digital information representing the coordinates at the breakpoints of a desired function;

an input terminal for receiving an analog signal, digital-to-analog converter means connected to said memory means for converting the output of said memory means to analog form;

comparator means connected to said input terminal and to said converter means for producing a first output indication if the output of said digital-to-analog converter means and said analog input signal are within predetermined limits and, producing a second output indication for continuously selecting new information from said memory when the output of said digital-to-analog conversion means and said analog input signal are not within said predetermined limits;

subtracter means connected to said memory means for producing first and second electrical signals representing the difference between selected ones of said coordinate information when said comparison means indicates that the output of said conversion means and said analog input signal is within said predetermined limits;

shift register means connected to said subtracter means for shifting left said difference signal until the said register means are full;

computing means including digital-analog multiplier means connected to said register means for receiving the output thereof thereby insuring minimization of errors introduced by said digital-analog multiplier means; and signal combining means including said digital-analog multiplier means connected to the output of said computing means and said input terminal for producing the desired function of a signal at said input terminal.

4. The digitally controlled function generator of claim 3 wherein said memory means includes two outputs for X and Y coordinate information respectively, and, wherein said comparison is accomplished on the X coordinate information only.

5. The digitally controlled function generator of claim 4 wherein said computing means solves the interpolation equation $$fx = Y_n + \frac{\Delta Y}{\Delta X}(X - X_n)$$

where $Y_n$ is a Y coordinate of a breakpoint in said function; $X_n$ is the corresponding X coordinate for said breakpoint, $\Delta Y$ and $\Delta X$ are the difference between adjacent Y and adjacent X coordinates, and X is a point intermediate adjacent breakpoints.

6. A digitally controlled function generator comprising:

memory means for storing digital signals representing the coordinate values of breakpoints of a desired arbitrary function;

an input terminal for receiving an analog signal;

comparison means having a first input connected to said memory means for receiving a first value of one of said coordinates, and a second value representing the next adjacent coordinate of said function;

an input terminal for receiving an analog signal connected to said comparison means;

said comparison means producing a first output indication of said analog signal as a magnitude within said first and second coordinate signals and producing a second output indication if said analog signal has a magnitude outside said first and second coordinate signals;

means connected to said comparison means for sequentially applying new values of said coordinate signal to said comparison means upon the occurrence of said second output indication until the occurrence of said first output indication;

first subtracter means connected to said memory means for producing a first difference signal representing a difference between coordinate values of said function upon the occurrence of said second output indication;

second subtracter means for producing a difference indication representing the difference between the other of said coordinate values upon the occurrence of said second output indication;

shift register means for each of said subtracter means producing respective output signals having a logical one and the most significant bit position;

respective digital-analog multiplier means connected to each of said register means for computing values of said desired function intermediate said breakpoints the digital-analog multiplier means having maximum response time; and means including said digital-analog multiplying means combining said intermediate values with said analog input signal thereby producing an output signal representing the desired function of said analog input signal.

* * * * *